US008453809B2

(12) United States Patent
Hall

(10) Patent No.: US 8,453,809 B2
(45) Date of Patent: Jun. 4, 2013

(54) SHOCK ABSORBER HAVING UNIDIRECTIONAL FLUID FLOW

(75) Inventor: Everett A. Hall, Farmington Hills, MI (US)

(73) Assignee: Oneiric Systems, Inc., Madison Heights, MI (US)

( * ) Notice: Subject to any disclaimer, the term of this patent is extended or adjusted under 35 U.S.C. 154(b) by 439 days.

(21) Appl. No.: 12/761,560

(22) Filed: Apr. 16, 2010

(65) Prior Publication Data

US 2010/0263973 A1   Oct. 21, 2010

Related U.S. Application Data

(60) Provisional application No. 61/169,843, filed on Apr. 16, 2009.

(51) Int. Cl.
*F16F 9/00* (2006.01)

(52) U.S. Cl.
USPC .............................. 188/315; 188/297; 188/314

(58) Field of Classification Search
USPC ................. 188/315, 275, 287, 297, 286, 313, 188/314, 318, 316, 317, 322.13, 322.19, 188/322.22
See application file for complete search history.

(56) References Cited

U.S. PATENT DOCUMENTS

| | | | |
|---|---|---|---|
| 2,804,513 A | 8/1957 | Oppel | |
| 3,371,751 A | 3/1968 | Dickinson | |
| 3,797,615 A | 3/1974 | Stembridge | |
| 4,031,989 A | 6/1977 | Blazquez | |
| 4,786,034 A | 11/1988 | Heess | |
| 5,441,132 A * | 8/1995 | Pradel et al. | 188/315 |
| 5,588,510 A | 12/1996 | Wilke | |
| 6,112,866 A | 9/2000 | Boichot | |
| 6,648,109 B2 | 11/2003 | Farr | |
| 6,793,049 B2 * | 9/2004 | Kazmirski | 188/275 |
| 6,899,206 B2 | 5/2005 | Antonovsky | |
| 6,913,126 B2 | 7/2005 | Dohrmann | |
| 7,216,747 B2 * | 5/2007 | Breese | 188/315 |
| 7,320,387 B2 | 1/2008 | Sendrea | |
| 7,448,479 B2 | 11/2008 | Fukuda | |
| 7,621,382 B2 * | 11/2009 | Zdeb | 188/315 |
| 2001/0006135 A1 | 7/2001 | Sasse et al. | |
| 2002/0121416 A1 | 9/2002 | Katayama | |
| 2007/0068754 A1 | 3/2007 | Furgala | |

* cited by examiner

*Primary Examiner* — Pamela Rodriguez
(74) *Attorney, Agent, or Firm* — The Weintraub Group, P.L.C.

(57) ABSTRACT

A twin-tube shock absorber comprising an outer tube which houses an inner tube. The inner tube forms an annulus area between the outer tube and the inner tube, and includes a check valve for allowing a fluid to flow unidirectionally from the annulus area to the interior volume of the inner tube. The shock absorber includes a piston which is slidably disposed within the inner tube and divides the interior volume into a rod side chamber and a cap side chamber. The piston includes a check valve allowing the fluid to flow unidirectionally from the cap side chamber to the rod side chamber. A flow regulator is disposed about the inner tube for allowing the unidirectional flow of fluid from the rod side chamber to the annulus area, wherein the flow regulator provides a resistance against the flow of the fluid from the rod side chamber to the annulus area.

12 Claims, 5 Drawing Sheets

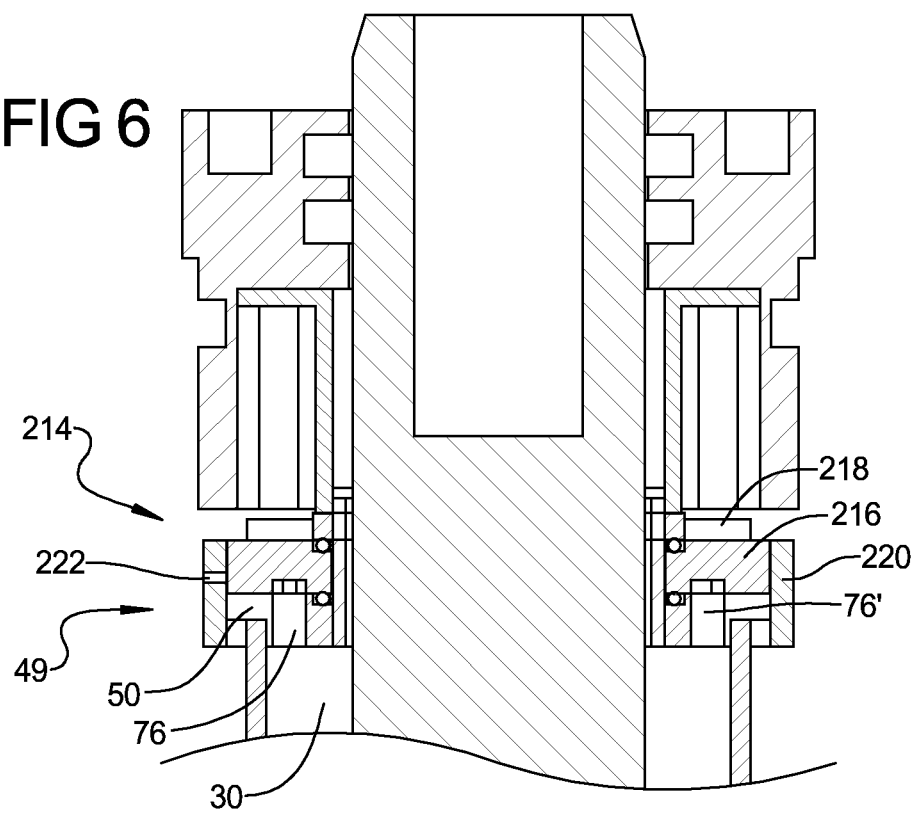
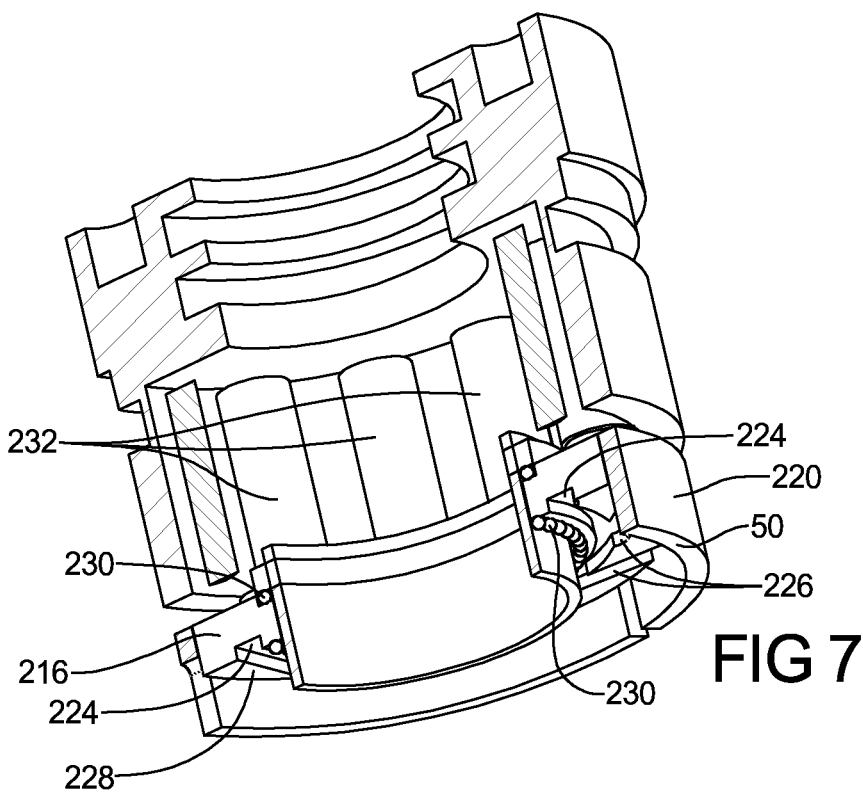

SHOCK ABSORBER HAVING UNIDIRECTIONAL FLUID FLOW

CROSS REFERENCE TO RELATED APPLICATION

This application claims the benefit of U.S. Provisional Application 61/169,843, which was filed on Apr. 16, 2009, the entire disclosure of which is hereby incorporated by reference.

BACKGROUND OF THE INVENTION

1. Field of the Invention

The present invention pertains to a shock absorber. More particularly, the present invention pertains to a shock absorber having a twin tube construction. Even more particularly, the present invention pertains to a twin tube construction shock absorber having unidirectional fluid flow.

2. Description of the Prior Art

Shock absorbers are well known in the art, such as found in U.S. Pat. No. 2,804,513 to Oppel; U.S. Pat. No. 5,588,510 to Wilke; U.S. Pat. No. 6,648,109 to Farr et al.; U.S. Pat. No. 6,913,126 to Dohrmann et al.; as well as U.S. Patent Publication No. 2002/0121416 to Katayama et al. The shock absorbers disclosed by Oppel, Wilke, Farr, Dohrmann, and Katayama are representative of the types of shock absorbers that are commonly available. Such shock absorbers generally comprise a cylinder and a piston, the piston being connected to a rod which experiences a load. Fluid is contained within the cylinder. As the piston experiences compression and rebound strokes, fluid is forced out of one side of the cylinder and fluid is forced into the other side through a series of valves. The valves may be disposed on the external portion of the shock absorber. The shock absorber may also provide additional external components for controlling the flow of fluid from one side of the cylinder to the other, thereby controlling the damping force of the shock absorber.

However, such existing designs require a series of complex valve components which can be expensive, difficult to maintain, and difficult to assemble. In addition, shock absorbers using this construction rely upon a series of valves to control the variability of the damping. Therefore, it is difficult to variably adjust the damping rate for these shock absorbers.

Thus, there remains a need for a shock absorber which has a simpler construction, requires less moving parts, allows for easy adjustment of the damping force, and which preferably requires the same or less room than shock absorbers which are found in the prior art.

The present invention, as is detailed hereinbelow, seeks to resolve these issues by providing a twin-tube construction shock absorber which has unidirectional fluid flow throughout the system and which comprises a minimal number of moving parts, and which may additionally have the damping force adjusted easily and/or remotely.

SUMMARY OF THE INVENTION

In a first embodiment hereof, the present invention provides a unidirectional twin-tube shock absorber which generally comprises:

(a) a cylindrically elongated outer tube having a first end and a second end;

(b) a cylindrically elongated inner tube housed within the outer tube, the inner tube having an interior surface, a first end, and a second end which define an interior volume, the inner tube forming an annulus area between the outer tube and the inner tube, the inner tube having a check valve which allows a fluid to flow unidirectionally from the annulus area to the interior volume of the inner tube;

(c) a piston slidably disposed within the inner tube, the piston having an outer circumferential surface dimensioned to form a barrier against the interior surface of the inner tube, the piston dividing the interior volume into a rod side chamber and a cap side chamber, the piston having a piston check valve which allows the fluid to flow unidirectionally from the cap side chamber to the rod side chamber;

(d) a piston rod secured to the piston and extending outwardly past the first end of the outer tube; and (e) a flow regulator secured to the inner tube which allows unidirectional flow of the fluid from the rod side chamber to the annulus area, wherein the flow regulator provides a resistance against the flow of the fluid from the rod side chamber to the annulus area.

The flow regulator can comprise a valve seat and a spring disk for directing the flow of the first fluid from the rod side chamber to the annulus area. The valve seat is generally disk-like in shape and has a generally circular outer circumferential edge and a central circular opening. The valve seat is preferably disposed about the first end of the inner tube and has the piston rod extending through the central circular opening. The valve seat comprises a plurality of orifice holes disposed about the valve seat, the orifice holes being in fluid communication with the rod side chamber.

The spring disk can be provided for regulating the flow of the first fluid from the orifice holes to the annulus area. The spring disk is generally disk-like in shape and has an inner circumferential edge defining a central circular opening through which the piston rod extends. The spring disk also has an outer circumferential edge. The spring disk is positioned over the valve seat and secured to the valve seat along the inner circumferential edge, wherein pressure from the fluid flowing through the orifice holes upwardly deflects the outer circumferential edge of the spring disk allowing the fluid to flow into the annulus area.

The present invention can optionally include a piston rod intrusion makeup area to compensate for volume taken up by the piston rod within the rod side chamber of the inner tube during compression. The piston rod intrusion makeup area comprises a portion of the annulus area which is filled with a compressible fluid, the compressible fluid preferably being a gaseous fluid, such as air or other gas. Alternatively, the intrusion makeup area may comprise a cylinder, which is housed either internally or externally of the outer tube, and which is in fluid communication with the annulus area.

The intrusion makeup area operates to compensate for the additional volume consumed by the piston rod during a compression stroke. As the piston rod enters the inner tube during a compression stroke, a volume of the fluid is displaced out of the inner tube by the piston rod, and into the annulus area. The intrusion makeup area compensates for this additional displacement by providing the compressible fluid which is compressed under pressure from the fluid. As the compressible fluid is compressed, it decreases in volume, thereby creating space for the increase in volume of the fluid in the annulus area.

For a more complete understanding of the present invention, reference is made to the following detailed description and accompanying drawing. In the drawing, like reference characters refer to like parts throughout the views in which:

BRIEF DESCRIPTION OF THE DRAWINGS

FIG. 6 is an enlarged section view wherein the flow regulator comprises a valve seat and a turbine; and FIG. 7 is an enlarged cutaway sectional view showing the turbine armature and a plurality of coil carriers.

DETAILED DESCRIPTION OF THE PREFERRED EMBODIMENTS

Figure 1:
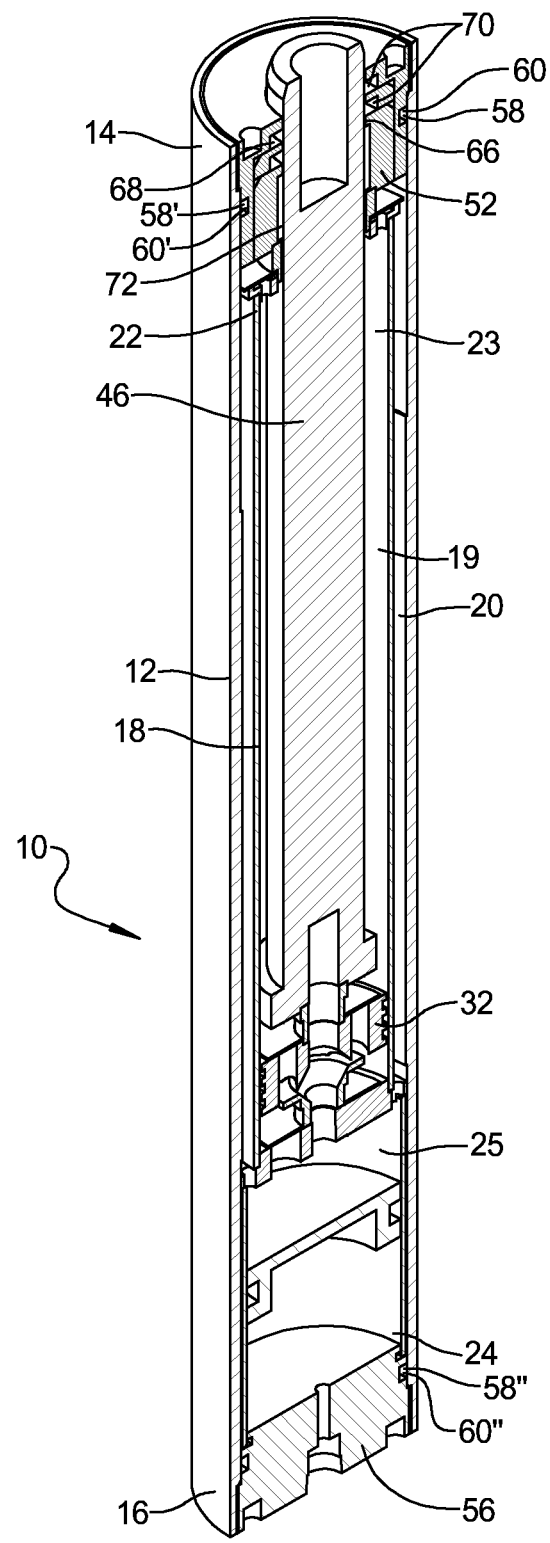
FIG. 1 is a perspective view in cross-section of a first embodiment of the present invention hereof.

In accordance with a first embodiment of the present invention and as shown generally in FIGS. 1-4, there is provided a shock absorber 10 having a twin tube construction. The shock absorber 10 comprises a cylindrical elongated outer tube 12 having a first end 14 and a second end 16. Although the first and second ends, 14 and 16, are preferably open, the first and second ends, 14 and 16, may be closed with a cap (not shown) after the internal components of the shock absorber 10 have been assembled therein. If cap ends are provided, they may be secured to the outer tube 12 by means which are well known in the art, such as by welding, crimping, threaded connection, or the like. The outer tube 12 is formed from materials which are well known in the art for use with shock absorbers, including but not limited to, carbon steel, aluminum, stainless steel, composite materials, or the like. Although not shown, the second end 16 of the outer tube 12 preferably comprises means for securement to an object such as an axle or a vehicle frame.

The outer tube 12 houses on inner tube 18. The inner tube 18 comprises a cylindrical elongated tube 19 having a first open end 22, a second open end 24, and an interior surface 23 which collectively define an interior volume 25. The inner tube 18 and the outer tube 12 are preferably substantially coaxially parallel with each other and define an annulus area 20 therebetween. The inner tube 18 is formed from materials which are well known in the art, including but not limited to, carbon steel, stainless steel, composite materials, or the like.

The inner tube 18 and the annulus area 20 are filled with a fluid 30. The fluid 30 may be either gaseous or liquid. Preferably, the fluid 30 is a liquid such as oil. The type of fluid used may be any suitable type which is well known in the art for use with shock absorbers.

Figure 2:
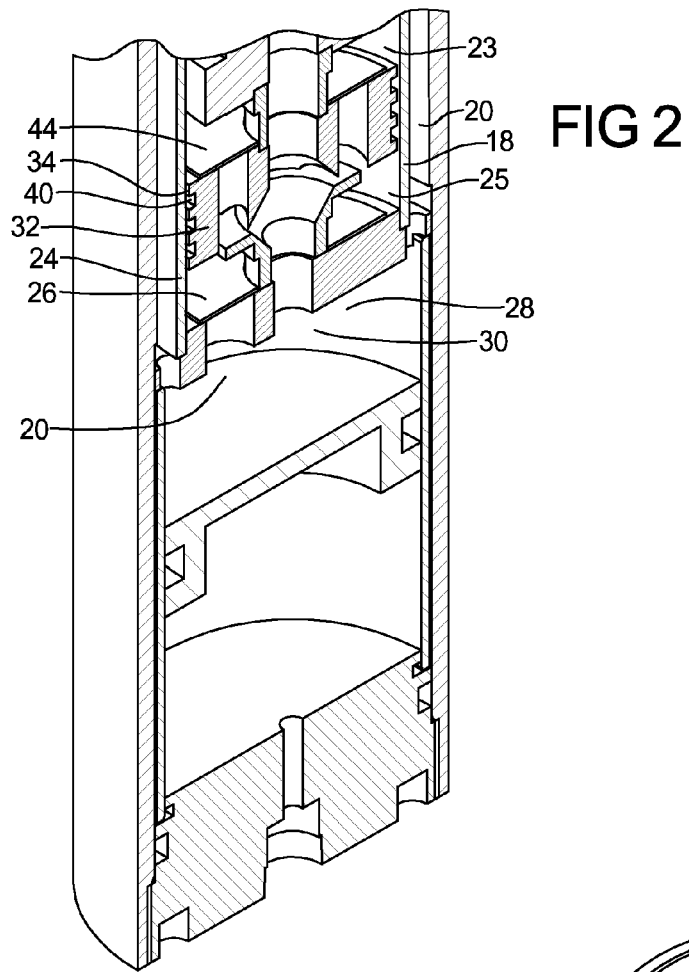
FIG. 2 is an enlarged perspective view in cross-section of the second end of the present invention.

As shown in FIG. 2, the inner tube 18 also comprises a check valve 26 located proximal to the second end 24 thereof. The check valve 26 places the annulus area 20 and the interior volume 25 of the inner tube 18 in fluid communication, and allows the fluid 30 to flow from the annulus area 20 into a cap side chamber 28 of the inner tube 18, as discussed in further detail below. Any suitable type of check valve which is well known in the art may be used, including but not limited to, a ball and spring check valve, such as found in U.S. Pat. No. 3,343,564 to Peeples et al., or a deflected disk check valve, such as found in U.S. Pat. No. 2,223,944 to Roy. Preferably, a deflected disk check valve is used because it has flow and pressure drop characteristics which are desirable for application in the present invention.

As seen in FIG. 2, the inner tube 18 houses a piston 32. The piston 32 is generally disk-like in shape and has an outer circumferential surface 34. The piston 32 is dimensioned such that the outer circumferential surface 34 of the piston 32 is juxtaposed the inner surface 23 of the inner tube 18, thereby forming a substantially fluid-tight barrier between the inner tube 18 and the piston 32. The piston 32 is capable of sliding to and fro along an axis of the inner tube 18, and divides the interior volume of the inner tube 18 into two separate chambers, namely, a rod side chamber 38 and a cap side chamber 28.

The outer circumferential surface 34 of the piston 32 may include a recess 40 extending thereabout for housing a seal (not shown), such as an O-ring or any other suitable type of seal. The seal assists in forming the barrier between the piston 32 and the inner tube 18. The seal also acts as a bearing between the inner tube 18 and the piston 32. The seal is formed from materials which are well known in the art, including but not limited to, polymers such as plastics or elastomers.

The piston 32 additionally comprises a check valve 44. The check valve 44 is of similar type as discussed above, and may be placed atop the piston 32 or retained within the piston 32. The piston check valve 44 places the cap side chamber 28 and the rod side chamber 38 in fluid communication, such that the fluid 30 may flow from the cap side chamber 28, through the piston check valve 44, and into the rod side chamber 38.

A piston rod 46 is provided which is secured to the piston 32. The piston rod 46 is substantially coaxially aligned with the inner tube 18, and extends outwardly from the piston 32 toward the first end 14 of the outer tube 12. The piston rod 46 extends through a central circular opening 48 of a valve seat 50 and through a rod side seal carrier 52, which are discussed in further detail below. The piston rod 46 has a distal end 54 which extends outwardly past the first end 14 of the outer tube 12. The distal end 54 of the piston rod 46 preferably includes means for securement (not shown) to an object (not shown), such as an axle or frame of a vehicle. The means for securement may include any suitable means which are well-known in the art, such as a bracket, clamp, and so forth.

Referring back to FIG. 1, the outer tube 12 houses the rod side seal carrier 52 and a cap side seal carrier 56. Each of the seal carriers 52,56 is located at its respective end of the outer tube 12. Each seal carrier 52,56 is substantially cylindrical in shape and dimensioned to be insertable into the outer tube 12. The seal carriers 52,56, are provided to support and seal the internal components of the shock absorber 10. Each seal carrier 52,56 comprises a plurality of seals 58,58', etc. for preventing fluid 30 from exiting the outer tube 12. Each seal carrier, 52 and 56, has at least one annular recess 60,60', etc. encircled about an outer circumferential surface 62, and at least one of the seals from the plurality of seals 58,58', etc. is disposed in each recess 60,60', etc. to seal the surface interface between the seal carriers 52,56 and the outer tube 12.

Each seal carrier 52,56 is formed from suitable materials which are non-porous and have desirable temperature and strength characteristics enabling them to last a long time, such as a metal (e.g. aluminum, brass, steel, etc.) or a polymer (e.g. nylon). Preferably the seal carriers 52,56 are made from steel.

Furthermore, each seal carrier 52,56 is secured within its respective end of the outer tube 12 by suitable means which are well known in the art. For instance, each seal carrier 52,56 may be press fit into the outer tube 12. Additionally the outer circumferential surface 62, of each seal carrier 52,56 and the inner surface 64 of each end of the outer tube 12 may be threaded for threaded interengagement with each other. As such, each seal carrier 52,56 may be threadably secured within its respective end of the outer tube 12.

It is to be understood by one having ordinary skill in the art that if an outer tube 12 is provided which has a closed second end 16, then the cap side seal carrier 56 is not required in order to seal the outer tube 12.

Figure 3:
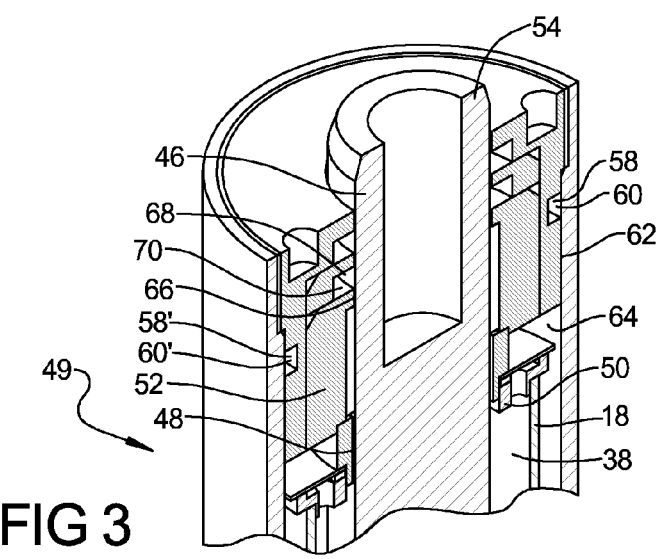
FIG. 3 is an enlarged perspective view in cross-section of the first end of the present invention.

As shown in FIGS. 1 and 3, the rod side seal carrier 52 also comprises an inner circular through-hole 66 which is dimensioned to retain the piston rod 46. The inner circular through-hole 66 comprises at least one annular recess 68 to retain a seal 70 for sealing the surface interface between the rod side seal carrier 52 and the piston rod 46. The seals 70 and 58,58', etc. used for sealing the seal carriers 52,56 are formed from materials which are well known in the art, including polymers such as plastics or elastomers.

In addition, the through-hole 66 of the rod side seal carrier 52 has a bearing surface 72 for maintaining the piston rod 46 in alignment with the inner and outer tubes, 14 and 12, respectively. The bearing surface 72 is preferably a linear bearing of the type which is well-known in the art. Even more preferably, the linear bearing comprises a plane bearing having a bearing surface made of polytetrafluoroethylene, which is commonly sold under the trademark Teflon®. Alternatively, the linear bearing may be a roller-type bearing having a plurality of recirculating ball bearings.

In use, the piston rod 46 is configured to be secured to a first object (not shown), such as the frame of a vehicle, and the outer tube 12 of the shock absorber 10 is configured to be secured to a second object (not shown), such as the axle of a vehicle. When the first and second objects move relative to each other, the piston 32 and piston rod 46 move relative to the inner and outer tubes 14,12 of the shock absorber 10. It is thus seen that the piston 32 and piston rod 46 slidably move relative to the inner tube 18 during operation of the shock absorber 10.

Figure 4:
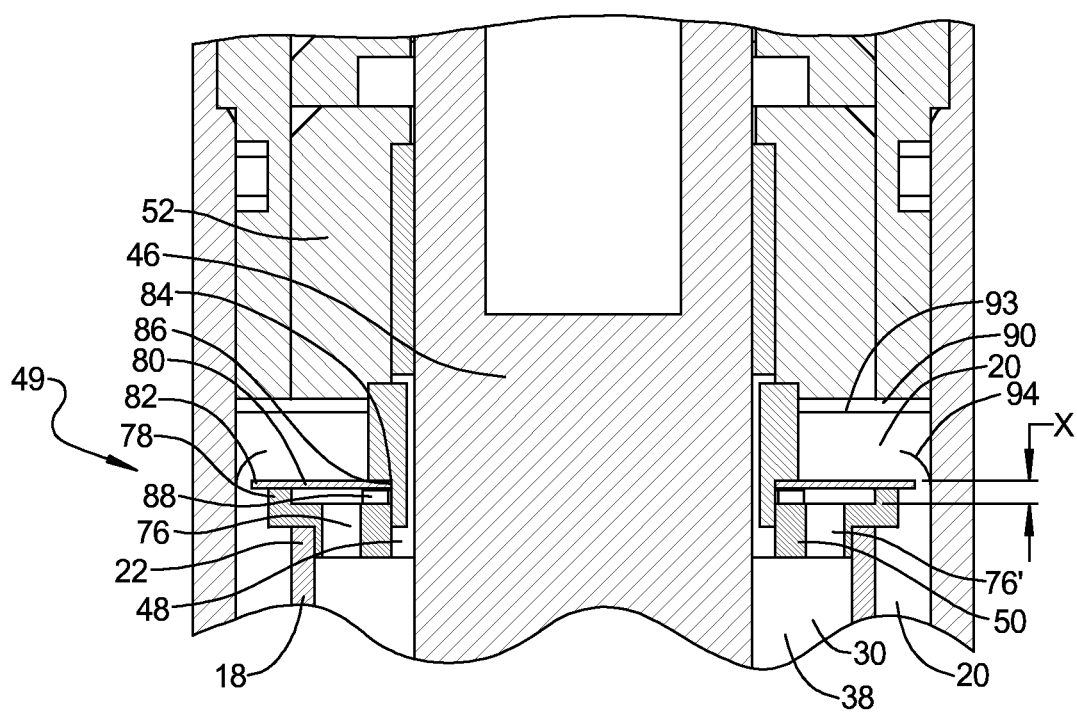
FIG. 4 is an enlarged sectional view of the valve seat and spring disk assembly according to the present invention.

Referring back to the internal components of the shock absorber 10 as shown in FIG. 4, a flow regulator 49 is provided for directing the fluid 30 to flow from the rod side chamber 38 to the annulus area 20. The flow regulator 49 can comprise a valve seat 50 and at least one spring disk 80. The valve seat 50 is generally disk-like in shape and is secured about the first end 22 of the inner tube 18. The valve seat 50 has a central circular opening 48 through which the piston rod 46 extends. The valve seat 50 comprises a plurality of orifice holes 76,76', etc. The orifice holes 76,76', etc. extend through the valve seat 50 such that the rod side chamber 38 of the inner tube 18 is placed in fluid communication with the area atop the valve seat 50. The orifice holes 76,76', etc. are disposed about the valve seat 50, preferably in an evenly-spaced array. The valve seat 50 further comprises a raised ridge, or land seat 78, which extends about the outermost circumferential edge of the valve seat 50. The land seat 78 can include notches for bleeding a minimal flow of fluid 30 past the valve seat 50, as will be better understood by the following discussion.

At least one spring disk 80 can be provided for regulating the flow of fluid 30 through the orifice holes 76,76', etc. and into the annulus area 20. The at least one spring disk 80 comprises a generally circular disk which is substantially planar or flat and is capable of being deflected. The spring disk 80 has an outer edge 82, a central circular opening 84, and an inner edge 86. The inner edge 86 encircles the piston rod 46. The spring disk 80 is positioned over the valve seat 50 such as shown in FIG. 4. The inner edge 86 is secured to the valve seat 50 in a manner which is described in further detail below. The outer edge 82 of the spring disk 80 sits atop, or abuts the land seat 78 of the valve seat 50.

In operation, pressurized fluid 30 flows up through the orifice holes 76, 76', etc. and applies an upward force against the bottom side of the spring disk 80. The spring disk 80 is deflected about the secured inner edge 86, thereby creating a gap between the outer edge 82 of the spring disk 80 and the land seat 78 through which the fluid 30 flows. The amount of pressure, or force, required to deflect the spring disk 80 (and allow the fluid 30 to flow) is commonly known in the art as the "blow off" pressure.

If more than one spring disk 80 is provided, then the plurality of spring disks 80 may be stacked together. In such an arrangement, each spring disk 80 from the plurality of spring disks 80 may have a consistent nominal thickness, such that adjusting the number of spring disks used may be a parameter employed for adjusting the blow off pressure.

The spring disk 80 is formed from any suitable material known in the art, including metals such as spring steel, and in particular, blue tempered spring steel. It is understood to those having ordinary skill is in the art that the material used should have a high yield strength so that the spring disk 80 does not experience plastic deformation. It is also understood by one of ordinary skill in the art that the type of material chosen for the spring disk 80, and its corresponding material properties, such as elasticity and strength, are a factor in determining the amount of force generated for any given velocity.

As shown in FIG. 4, the inner edge of the spring disk 80 is secured between the rod side seal carrier 52 and the valve seat 50 by a plurality of shims 88. At least one shim 88 can be positioned below and above the spring disk 80. The shims 88 and the spring disk 80 are clamped tightly between the rod side seal carrier 52 and the valve seat 50, thereby securing the inner edge 86 of the spring disk 80 in position. The quantity and thickness of the shims 88 used determines the shim height, which is designated as x in FIG. 4. For any particular spring disk thickness, as the shim height x decreases, the blow off pressure increases. The shims 88 are formed from suitable materials well-known in the art, including, carbon steel. It is to be appreciated by one having ordinary skill in the art that the shim height is one of several factors relevant to determining the blow off pressure. It is also to be understood by those having ordinary skill in the art that assembling the spring disk 80 and shims 88 in a manner which requires a force to deflect the spring disk 80 away from the land seat 78 is referred to as "preloading."

The rod side seal carrier 52, valve seat 50, spring disk 80, and shims 88 may be assembled together by a number of suitable methods. Preferably, the valve seat 50 is placed into the outer tube 12 (sitting atop the inner tube 18), and at least one shim 88 is placed over the valve seat 50. The spring disk 80 is then placed atop the at least one shim 88. At least one additional shim 88 is then placed over the spring disk 80. The rod side seal carrier 52 is then placed over the valve seat 50, spring disk 80, and shims 88. The rod side seal carrier 52 is secured in position, thereby securing the valve seat 50, inner edge 86 of the spring disk 80, and shims 88 in position. Alternatively, an assembly of the rod side seal carrier 52, shims 88, spring disk 80, and valve seat 50 may be press fit together, and assembled into the shock absorber 10 as an assembled unit.

In a further alternate method of assembly, the valve seat 50 and rod side seal carrier 52 may be provided with corresponding threaded surfaces such that the shims 88 and spring disk 80 may be assembled onto the valve seat 50, and the rod side seal carrier 52 and valve seat 50 may then be threadably secured to each other. The entire threaded assembly may then be inserted into the shock absorber 10. Otherwise, the threaded valve seat 50, shims 88, and spring disk 80 may be inserted into the shock absorber 10 and the threaded rod side seal carrier 52 may then be threadably secured to the threaded valve seat 50.

The present invention may also provide a piston rod intrusion makeup area 90 to compensate for volume taken up by the piston rod 46 within the inner tube 18 during a compression stroke. During a compression stroke, the piston rod 46 enters the inner tube 18, thereby taking up an increasing amount of volume within the inner tube 18. Since the inner tube 18 has a finite interior volume, a piston rod intrusion makeup area 90 may be provided to compensate for the increase in volume of the piston rod 46. The piston rod intrusion makeup area 90 contains a volume of compressible fluid 91 and is in fluid communication with the annulus area 20. Preferably the intrusion makeup area 90 is located within the annulus area 20, however, it can be positioned in any other suitable location, even including outside the shock absorber 10 itself.

The intrusion makeup area 90 can optionally include a fluid separator 93 to isolate the fluid 30 and the compressible fluid 91 from mixing with each other during operation. As understood by one of ordinary skill in the art, mixing of the two fluids is undesirable, particularly when the fluid 30 is a liquid and the compressible fluid 91 is a gas. The fluid separator 93 can comprise a flexible membrane (e.g., membrane formed from a flexible polymer such as an elastomer), a floating physical barrier (e.g., a floating disc or cylinder), or any other suitable means for isolating the fluids from each other to minimize or eliminate intermixing.

In operation, as the piston rod 46 enters the inner tube 18, fluid 30 is displaced by the piston rod 46 and forced into the annulus area 20. As the fluid 30 becomes pressurized, it compresses the compressible fluid 91 in the intrusion makeup area 90, thereby allowing the fluid 30 to expand into a portion of the intrusion makeup area 90. The compressible fluid 91 housed in the intrusion makeup area 90 may be air or a gas, such as nitrogen, xenon, or the like. The compressible fluid 91 may be at atmospheric pressure or it may be pressurized. Preferably, the compressible fluid 91 is either air (at either atmospheric pressure or compressed) or compressed nitrogen. It may also be possible that the compressible fluid 91 comprises a closed cell foam rather than a gaseous fluid in situations where aeration or cavitation occurs.

The present invention can optionally provide means for diverting fluid flow 94 from the valve seat 50 into the annulus area 20. The means for diverting fluid flow 94 can be provided to assist the fluid flow from becoming turbulent as it exits the valve seat 50. The means for diverting fluid flow 94 may comprise a curved disk, a downwardly pointing vent, or any other suitable means which are well-known in the art. The flow of the fluid 30 is preferably laminar as it exits the valve seat 50 so that it does not become aerated or experience cavitation.

In use, the shock absorber 10 is continuously experiencing compression and rebound strokes. In a typical shock absorber, fluid moves in a bidirectional flow back and forth from one side of the piston to the other, as well as in and out of a rod intrusion makeup area connected to the rod side chamber. However, in the present invention, the fluid 30 flows unidirectionally regardless of whether the shock absorber 10 is experiencing a compression or rebound stroke, as discussed below.

According to the present invention, during a compression stroke the piston 32 is forced downward by the piston rod 46. The check valve 44 in the piston 32 allows the fluid 30 to flow from the cap side chamber 28 to the rod side chamber 38. The inner tube check valve 26 does not allow the fluid 30 in the cap side chamber 28 to exit through the inner tube check valve 26. However, as the piston rod 46 enters the inner tube 18, it consumes an increasing amount of volume within the inner tube 18, thereby forcing that same volume of fluid 30 out of the rod side chamber 38, through the orifice holes 76,76', etc., past the spring disk 80, and into the intrusion makeup area 90. It is thus seen that during the compression stroke, the force required to deflect the spring disk 80 and the force required to compress the compressible fluid 91 in the intrusion makeup area 90 collectively provide a damping force to the piston rod 46.

During the rebound stroke, the piston 32 and the piston check valve 44 force fluid 30 out of the rod side chamber 38, through the orifice holes 76,76', etc., past the deflected spring disk 80, and into the annulus area 20. As the piston rod 46 exits the inner tube 18, the piston rod 46 itself consumes less volume, and the fluid 30 exits the intrusion makeup area 90. As the fluid 30 is forced into the annulus area 20, it flows through the inner tube check valve 26, and into the cap side chamber 28 of the inner tube 18. It is noted that, since the fluid 30 is contained within a sealed system, the piston 32 also creates a vacuum in the cap side chamber 28 during rebound, thereby contemporaneously drawing the fluid 30 into the cap side chamber 28. During rebound, the spring disk 80 provides the damping force to the shock absorber 10.

It is thus seen that, as the shock absorber 10 repetitively experiences compression and rebound, the fluid 30 continues to flow up from the cap side chamber 28 to the rod side chamber 38, through the orifice holes 76,76', etc., past the deflected spring disk 80, into the annulus area 20, through the inner tube check valve 26, and once again into the cap side chamber 28 of the inner tube 18.

Figure 5:
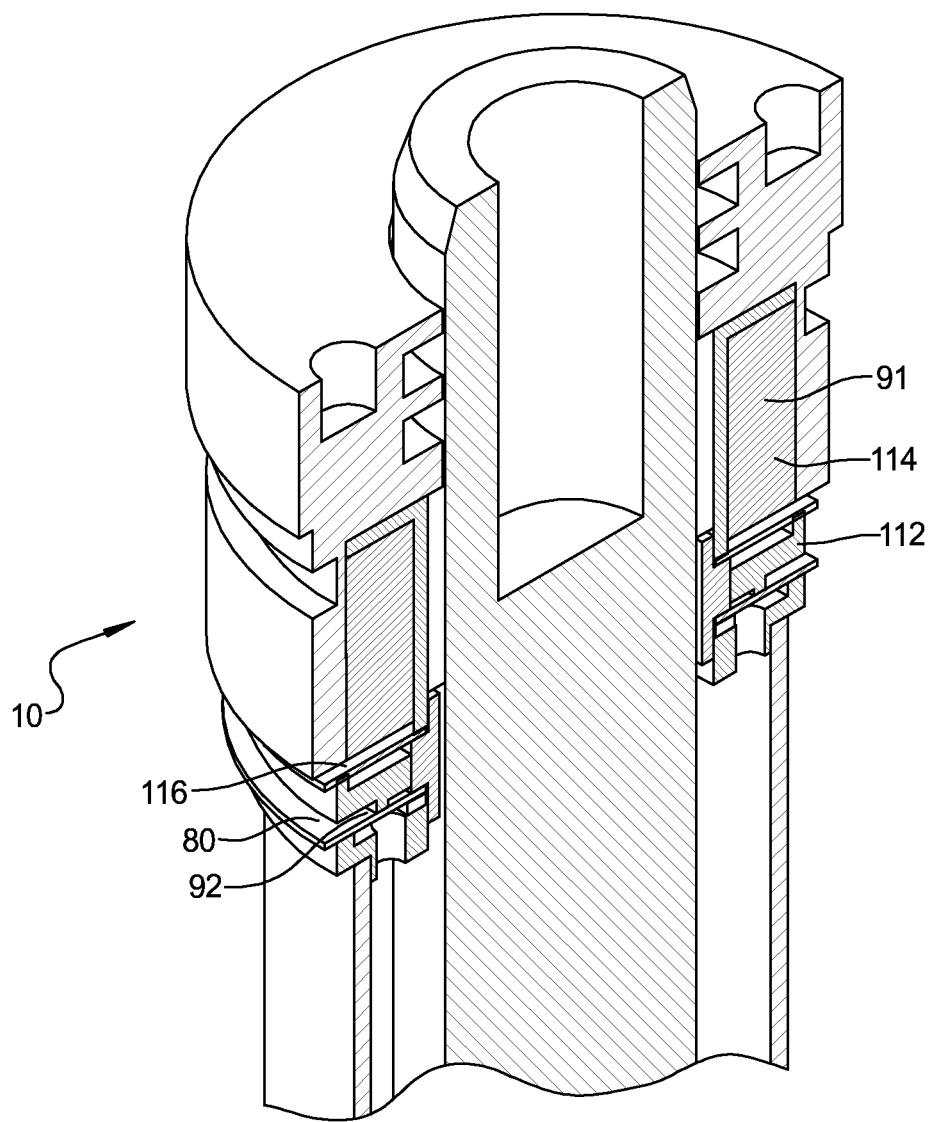
FIG. 5 is an enlarged section view wherein the flow regulator comprises a valve seat, a pre-load seat, and an electromagnet.

As shown in FIG. 5, in addition to the valve seat 50 and the spring disk 80, the flow regulator 49 can optionally include a pre-load seat 112 and/or an actuator 114. The pre-load seat 112 is juxtaposed a top surface 92 of the spring disk 80. The pre-load seat 112 is preferably generally circular in shape. Preferably, the pre-load seat 112 is secured to the spring disk 80, and can be formed from a magnetic material. The pre-load seat 112 is concentrically positioned over the spring disk 80 and may be dimensioned to contact the spring disk 80 at a particular radial length from the center point of the spring disk 80. It is thus seen that by varying the radial contact position between the pre-load seat 112 and the spring disk 80, the mechanical advantage of the pre-load seat 112 over the spring disk 80 may by variably adjusted. Furthermore, the spring disk 80 can optionally have an oversized diameter such that the outer circumferential edge of the spring disk 80 may extend beyond the land seat 78, and the pre-load seat 112 can be positioned over the spring disk 80 at a radial position outside the land seat 78, thereby giving the pre-load seat 112 a further mechanical advantage.

It is also appreciated that the radial position of the pre-load seat 112 on the spring disk 80 is yet another factor which contributes to the resulting damping force of the shock absorber 10.

The actuator 114 can be provided for applying a force to the pre-load seat 112. The actuator 114 is preferably any suitable type of electro-mechanical device, such as the type including an electromagnet, for example, a solenoid. The actuator 114 is configured to receive electrical current from a source such as a battery or an alternator. Means for connecting 116 the actuator 114 to each pre-load seat 112 can be provided such that, by conducting electricity through the actuator 114, the actuator 114 applies a force to the pre-load seat 112, which in turn, applies that force to the top surface 92 of the spring disk 80. The means for connecting 116 may comprise a rod, coil, spring, or the like. In addition, the pre-load seat 112 may be formed from a magnetic material, such that a magnetic force may be applied to the pre-load seat 112 by the actuator 114. It is thus seen that, by varying the electrical current through an actuator 114, the resulting force applied to the spring disk 80 is proportionately varied. It is noted that the force applied to the spring disk 80 by the actuator 114 can be either an upward or downward force. As such, the amount of force required to deflect the spring disk 80 can be controlled by electro-mechanical means, so long as the spring disk 80 remains secured to the actuator 114.

It is to be understood by one having ordinary skill in the art that, according to this arrangement, the blow off pressure is equal to the preload force of the spring disk 80 against the land seat 78 plus the amount of force applied onto the top surface 92 of the spring disk 80 by the actuator 114. Therefore, in such an embodiment, it may be possible to reduce the preload force of the spring disk 80 such that the blow off pressure is substantially equal to the amount of downward force applied by the actuator 114.

The means for connecting 116 can also apply an upward force on the spring disk 90. As such, the actuator 114 and means for connecting 116 can be configured to decrease the blow off pressure when the electromagnetic 114 applies an upward force to reduce the damping force for effectively creating a "negative" blow off pressure. The means for connecting 116 can compromise any suitable component well-known in the art, such as a rod or other suitable member secured to the actuator 114 and the spring disc 90.

Means for controlling 118 the flow regulator 49 can also be provided to monitor and adjust the force required to deflect the spring disk 80. The means for controlling 118 the flow regulator 49 can comprise any suitable type of control system, such as a computer or logic control system which can monitor and supply the actuator 114 with the correct amount of electricity to adjust the blow off pressure accordingly. For example, in use with a vehicle, the vehicle's computer system, or chip, may provide information related to preferred damping rates which determines how much force is necessary to deflect the spring disk 80. As such, the vehicle's computer is configured to remotely control the damping force at each shock absorber 10. With regard to this aspect, the means for controlling 118 can be configured to provide variable settings dependent upon vehicle speed, g-forces experienced by the vehicle, road conditions, weather conditions, and so forth. The means for controlling 118 can also be configured to have various pre-settings which may be manually selected so that the user of the vehicle may choose a particular setting dependent upon driving style, personal preference, weather conditions, and so forth.

Furthermore, the means for controlling 118 is capable of instantaneously changing the damping force at each shock absorber 10 to adjust to changing road conditions. For example, during vehicle acceleration or deceleration, the means for controlling 118 may increase or decrease the damping force at each individual shock absorber 10 to minimize nose dip or rise of the vehicle. In addition, the means for controlling 118 is capable of instantly adjusting the damping force during tight cornering to increase ride stability and comfort in the vehicle cabin. It is to be appreciated that the damping settings may be changed by the means for controlling 118 as quickly as electrical current can run through the system.

As shown in FIGS. 6 and 7, in yet another configuration, the flow regulator 49 can comprise the valve seat 50 and at least one turbine 214 which is configured to be driven by flow of the fluid 30 through the plurality of orifice holes 76,76', etc.

It is to be understood that such an embodiment is possible because the flow of fluid 30 through the orifice holes 76,76', etc. is unidirectional.

In this arrangement, the valve seat 50 can optionally include a collar 220 extending about the outer edge of the valve seat 50. The collar 220 can include a plurality of outlets 222, which are discussed in further detail below.

The turbine 214 includes a rotating, or spinning, armature 216 secured over the valve seat 50 in place of the spring disk. The armature 216 includes a disc, or ring-like, shaped magnet 218 secured thereon which rotates with the armature 216. The magnet 218 is preferably a permanent magnet.

The lower surface 228 of the armature 216 includes an annular recess 224 which receives the fluid 30 passing through the orifice holes 76,76, etc. The armature 216 also includes a plurality of vanes, or angled passages, 226 disposed about the lower surface 228 and in fluid communication with the annular recess 224. The armature 216 is positioned over the valve seat 50 such that the orifice holes 76,76', etc. are juxtaposed the annular recess 224. It is thus seen that the fluid 30 flows through the orifice holes 76,76', etc., into the annular recess 224, through the plurality of angled passages 226, and out the plurality of outlets 222 on the collar 220.

In use, the fluid 30 flows through the orifice holes 76,76', etc. and applies a rotational force against the plurality of angled passages 226, thereby rotating the armature 216 and magnet 218. It is preferred that the plurality of angled passages 226 and plurality of outlets 222 be dimensioned and arranged (i.e., by the quantity of and/or geometry of the passages and/or outlets) to operate together such that the fluid 30 always has at least one aligned passage/outlet pair to allow the fluid 30 to flow therethrough so that the armature will not experience static lock. Preferably the plurality of angled passages 226 and the plurality of outlets 222 are dimensioned and arranged to spin the armature 216 and magnet 218 with maximum efficiency and/or to provide preferred damping characteristics to the shock absorber 10.

The armature 216 is secured in place and rotates along a plurality of bearings 230, or other suitable means for rotatably mounting which provide a negligible amount of rotational resistance due to structural impediments. It is desired that as much energy be converted into electricity as possible. It is noted that the plurality of bearings 230 and the armature 216 provide a seal with the inner tube 18 to prevent the fluid 30 from escaping.

The flow regulator also includes a plurality of coil carriers 232 disposed about the inner tube 18 and positioned proximate to the magnet 218. Each of the coil carriers 232 comprises coiled rods or any other suitable structure for generating electricity as a result of the electromagnetic field created by the spinning magnet 218.

When the flow regulator 49 comprises a turbine 214 and a plurality of coil carriers 232, it is to be appreciated that the force required to rotate the armature 216 provides the damping force by providing resistance to the flow of the fluid 30 throughout the shock absorber 10. Therefore, the damping of the shock absorber 10 may be variably adjusted by adjusting the electrical load applied to the armature 216 by the plurality of coil carriers 232. It is to be understood that the electricity which is generated can either be stored or fed back into the vehicle's electrical system.

The means for controlling 118 the flow regulator 49 can be provided to control the turbine 214 in this embodiment as well. For instance, the means for controlling 118 can control the damping rate of the shock absorber 10 by adjusting the electrical load on the turbine, which in turn, adjusts the amount of force necessary to rotate the armature 216.

It is to be appreciated that this arrangement is not limited in scope to the specific description herein. The present invention may be outfitted with at least one turbine according to any suitable structural arrangement which allows the armature to be driven by fluid flowing through the shock absorber.

It is to be understood that the present invention is not limited to the specific aspects described above. The shock absorber may comprise any or all combinations of the disclosed embodiments. In addition, the present invention is not limited to any specific material types, and it is contemplated that the present invention embodies any materials which may be suitable for use herewith.

It is to be appreciated that the flow regulator can be interchanged with either of the check valves, and that the flow regulator need not specifically restrict the flow of fluid from the inner tube to the annular area as described in the exemplary embodiment above.

It is to be further understood that the valve seat and spring disk, as operably discussed herein, may be used for other applications in which flow rate and/or pressure through an orifice need be controlled. For instance, the valve seat and spring disk may be used in pressure control valves to control the pressure and flow through the orifice holes. Just as described above, an electromagnet or a turbine may be used to control the flow and/or pressure through a valve, as well as to reclaim kinetic energy into electrical energy.

It is to be further appreciated by one of ordinary skill in the art that one of the benefits of the present invention is that it provides a self-bleeding shock absorber. For instance, if there is a volume of air contained within either the cap side or rod side chambers, it will work its way through the system as the shock absorber experiences compression and rebound strokes until it flows though the shock absorber and into the makeup intrusion area.

An additional benefit of the present invention is that a fluid filter may be installed within the shock absorber. Because the fluid experiences unidirectional flow, it is possible to install a filter in the fluid path so as to filter contaminants out of the fluid during use. It is to be appreciated by one having ordinary skill in the art that such a feature is not easily possible for use in a shock absorber having bidirectional fluid flow.

It is further contemplated that a benefit of the present invention is a more uniform temperature gradient throughout the shock absorber than shock absorbers which exist in the prior art. Because the shock absorber has a unidirectional fluid flow, the continuously flowing fluid assists in transferring heat from the outer tube to the inner tube, thereby providing a shock absorber having a more uniform temperature gradient. It is appreciated by one of ordinary skill in the art that structural failure due to, or accelerated by, extreme temperatures will be significantly reduced due to the present invention's inherent ability to evenly distribute heat throughout the shock absorber.

It is also understood that the shock absorber disclosed herein may be used with, or on, any suitable apparatus which has components that experience relative motion, and for which it may be desirable to dampen the movement therebetween. Therefore, present intention is not limited to use only on vehicles.

As is apparent from the preceding, the present invention provides a shock absorber having a twin tube construction with unidirectional fluid flow which provides a simple construction with minimal parts, and which may have the damping force instantaneously varied very easily and remotely.

What is claimed is:

1. A shock absorber comprising:
a cylindrically elongated outer tube having a first end and a second end;
a cylindrically elongated inner tube housed within the outer tube, the inner tube having an interior surface, a first end, and a second end which define an interior volume, the inner tube forming an annulus area between the outer tube and the inner tube, the inner tube having a check valve which allows a fluid to flow unidirectionally from the annulus area to the interior volume of the inner tube;
a piston slidably disposed within the inner tube, the piston having an outer circumferential surface dimensioned to form a barrier against the interior surface of the inner tube, the piston dividing the interior volume into a rod side chamber and a cap side chamber, the piston having a piston check valve which allows the fluid to flow unidirectionally from the cap side chamber to the rod side chamber;
a piston rod secured to the piston and extending outwardly past the first end of the outer tube; and
a flow regulator secured to the inner tube which allows the unidirectional flow of the fluid from the rod side chamber to the annulus area, wherein the flow regulator provides a resistance against the flow of the fluid from the rod side chamber to the annulus area, the flow regulator comprising a valve seat and a spring disk, the valve seat being substantially disk-like in shape and having a substantially circular outer circumferential edge including a raised land seat extending thereabout, the valve seat including a central circular opening having the piston rod extending therethrough, the valve seat comprising a plurality of orifice holes extending through the valve seat and being disposed thereabout, the orifice holes being in fluid communication with the rod side chamber; and the spring disk being substantially disk-like in shape and having an inner circumferential edge defining a central circular opening having the piston rod extending therethrough, and an outer circumferential edge, the spring disk being positioned atop the valve seat and secured to the valve seat along the inner circumferential edge, the outer circumferential edge being juxtaposed by the land seat, wherein the fluid flowing through the orifice holes forces the outer circumferential edge of the spring disk to deflect away from the land seat, thereby allowing the fluid to flow into the annulus area.

2. The shock absorber of claim 1 wherein the inner circumferential edge is positioned between at least a pair of shims such that the number of shims placed on each side of the inner circumferential edge varies the position of the inner circumferential edge with respect to the outer circumferential edge which is abutted against the land seat, thereby adjusting the amount of force required to deflect the spring disk.

3. The shock absorber of claim 2 comprising a rod intrusion makeup area containing a volume of compressible fluid.

4. The shock absorber of claim 3 wherein the rod intrusion makeup area includes a fluid separator for isolating the fluid from the compressible fluid.

5. The shock absorber of claim 1 comprising a rod intrusion makeup area containing a volume of compressible fluid which is in fluid communication with the annulus area.

6. The shock absorber of claim 5 wherein the rod intrusion makeup area includes a fluid separator for isolating the fluid from the compressible fluid.

7. The shock absorber of claim 1 wherein the flow regulator comprises a pre-load seat secured to the spring disk, and an electromagnet in operable connection with the pre-load seat, wherein supplying the electromagnet with electricity applies a force to the pre-load seat and the spring disk.

8. The shock absorber of claim 7 comprising means for controlling the flow regulator to monitor and adjust the force required to deflect the spring disk by adjusting the flow of electricity to the electromagnet.

9. The shock absorber of claim 8 comprising a rod intrusion makeup area containing a volume of compressible fluid.

10. The shock absorber of claim 9 wherein the rod intrusion makeup area includes a fluid separator for isolating the fluid from the compressible fluid.

11. The shock absorber of claim 7 comprising a rod intrusion makeup area containing a volume of compressible fluid.

12. The shock absorber of claim 9 wherein the rod intrusion makeup area includes a fluid separator for isolating the fluid from the compressible fluid.

* * * * *